United States Patent
Cortada Acosta et al.

(10) Patent No.: US 9,926,909 B2
(45) Date of Patent: *Mar. 27, 2018

(54) LOCKING ARRANGEMENT FOR A WIND TURBINE AND WIND TURBINE HAVING SUCH LOCKING ARRANGEMENT

(71) Applicant: Alstom Renovables España, S.L., Barcelona (ES)

(72) Inventors: Pere Cortada Acosta, Sant Cugat del Vallès (ES); Jordi Ayneto Pou, Premià de Dalt (ES)

(73) Assignee: GE Renewable Technologies Wind B.V., Breda (NL)

( * ) Notice: Subject to any disclaimer, the term of this patent is extended or adjusted under 35 U.S.C. 154(b) by 220 days.

This patent is subject to a terminal disclaimer.

(21) Appl. No.: 14/376,400

(22) PCT Filed: Feb. 28, 2013

(86) PCT No.: PCT/EP2013/053997
§ 371 (c)(1),
(2) Date: Aug. 1, 2014

(87) PCT Pub. No.: WO2013/127900
PCT Pub. Date: Sep. 6, 2013

(65) Prior Publication Data
US 2014/0369838 A1    Dec. 18, 2014

Related U.S. Application Data

(60) Provisional application No. 61/640,823, filed on May 1, 2012.

(30) Foreign Application Priority Data

Mar. 1, 2012  (EP) .................................... 12382076

(51) Int. Cl.
F03D 7/02    (2006.01)
F03D 9/25    (2016.01)
F03D 80/50   (2016.01)

(52) U.S. Cl.
CPC ......... F03D 7/0268 (2013.01); F03D 7/0248 (2013.01); F03D 9/25 (2016.05);
(Continued)

(58) Field of Classification Search
CPC ....... F03D 7/0268; F03D 7/0248; F03D 1/003
See application file for complete search history.

(56) References Cited

U.S. PATENT DOCUMENTS 6,430,816 B2 *  8/2002  Neveux ........................ 30/155
7,397,145 B2    7/2008  Struve et al.
(Continued)

FOREIGN PATENT DOCUMENTS

EP  1291521   3/2003
EP  2343454   7/2011
(Continued)

OTHER PUBLICATIONS

International Search Report and Written Opinion for PCT/EP/2013/053997, dated Mar. 22, 2013, 12 pgs.

*Primary Examiner* — Jason Shanske
*Assistant Examiner* — Cameron Corday
(74) *Attorney, Agent, or Firm* — Dority & Manning, P.A.

(57) ABSTRACT

A locking arrangement comprises a locking member having a longitudinal axis that is contained in a working plane where shear forces are concentrated when the locking member is in a locking position. The working plane is arranged substantially parallel to the axis of rotation of the parts to be locked when in said locking position in which at least one part of the wind turbine is prevented from being rotated relative to at least another part around said axis of rotation.

(Continued)

A Wind turbine generator is provided having a rotor with a rotor flange portion and a stator with a stator flange portion, with both flange portions being complimentarily shaped and defining a locking housing for receiving said locking member.

3 Claims, 2 Drawing Sheets

(52) U.S. Cl.
CPC .......... *F03D 80/50* (2016.05); *F05B 2260/30* (2013.01); *Y02E 10/725* (2013.01); *Y02E 10/726* (2013.01)

(56) References Cited

U.S. PATENT DOCUMENTS

| | | |
|---|---|---|
| 8,944,766 B2 * | 2/2015 | Nielsen .................. F03D 1/003 416/169 R |
| 2010/0021299 A1 | 1/2010 | Aarhus et al. |
| 2010/0194114 A1 | 8/2010 | Pechlivanoglou et al. |
| 2010/0202884 A1 | 8/2010 | Wedekind et al. |
| 2011/0135481 A1 | 6/2011 | Koronkiewicz |
| 2013/0330192 A1 * | 12/2013 | Claramunt Estecha F03D 11/00 416/169 R |

FOREIGN PATENT DOCUMENTS

| | | |
|---|---|---|
| WO | WO 2005/090780 | 9/2005 |
| WO | WO 2008/059088 | 5/2008 |
| WO | WO 2008/155053 | 12/2008 |
| WO | WO 2010/102967 | 9/2010 |

* cited by examiner

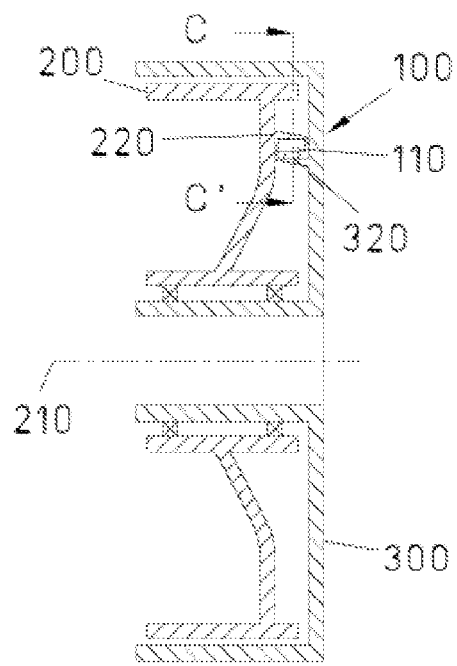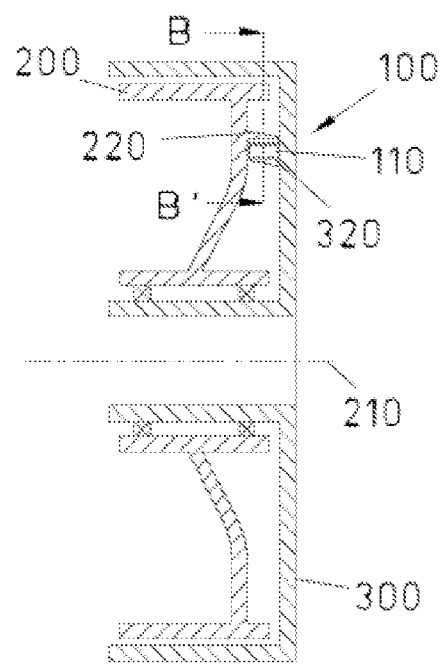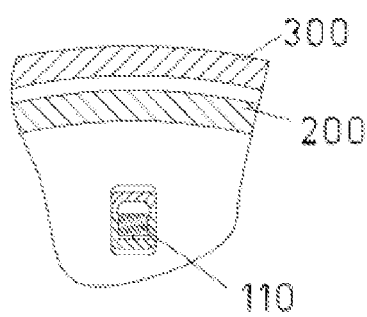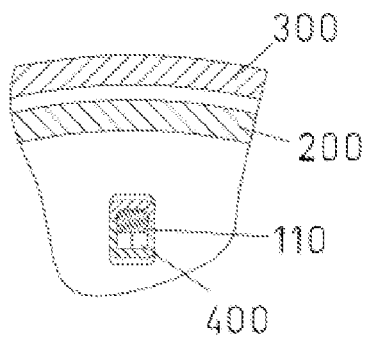

LOCKING ARRANGEMENT FOR A WIND TURBINE AND WIND TURBINE HAVING SUCH LOCKING ARRANGEMENT

A locking arrangement for preventing at least one part to be rotated relative to at least another part around an axis of rotation in wind turbine applications.

And a wind turbine generator in which such locking arrangement is applied.

BACKGROUND

A number of movable parts in a wind turbine need to be locked in certain conditions. For example, the generator rotor in a wind turbine generator must be locked against rotation relative to the generator stator or to the nacelle for maintenance and/or repair operations.

According to current applicable guidelines for the certification of wind energy plants, provision must be made for the positive locking of the rotor. Therefore mechanical interlocking should be provided in the wind turbine for performing the above mentioned operations and in general for purposes where the rotor must be locked against rotation. This means that for example frictional brakes and the like are not allowed according to these guidelines.

In this respect, it is known in the art the use of locking arrangements for locking the rotor of a wind turbine generator against rotation. These locking arrangements comprise one or more locking pins that are fixedly arranged to the stator of the wind turbine generator. When service activities are required in the wind turbine, a brake assembly is actuated to stop the wind turbine in operation. Once the wind turbine generator is stopped, the locking arrangement can be then activated to lock the rotor against rotation. The activation of the locking arrangement is carried out by driving a locking member or locking pin into a corresponding locking housing that is usually formed in the rotor. Driving of the locking pin can be carried out manually or hydraulically along the axis of the locking pin. The axis of the locking pin is substantially parallel to the rotor axis. Once the locking pin is inserted into a target locking hole, the rotor is prevented from being rotated relative to the stator and service activities can take place safely.

One of the major drawbacks associated with the locking of mutually rotating elements in a wind turbine, such as the rotor relative to the stator, according to the above known method, is the large tolerances existing in the relative position of the locking pins and the locking holes when in the locking position. This further results in alignment problems of the locking pins and the corresponding locking holes.

Another problem with known locking arrangements is that wind turbines are currently becoming bigger in order to produce more energy. This involves increased dimensions of the generator such that the locking pins are also bigger. Since the locking pins must be manufactured to withstand the requirements of operating within harsh working conditions of the wind turbine, costs become undesirably high. This also applies to the actuating mechanisms for driving the locking pins into and out of the locking position which need to be dimensioned in order to withstand high loads. This again results in high costs and overweight.

In addition, the increased dimensions of the wind turbines and parts thereof have led to increased loads on the locking arrangement. Consequently, concentration of shear forces has become an important issue. Alternative materials for the locking arrangements or the increase in their size are solutions that are not useful for withstand the extremely high loads involved in current wind turbines.

Although the use of several locking pins could help to solve this problem, costs and misaligning problems still remain.

Document EP1291521 discloses a locking arrangement for a wind turbine rotor. The locking arrangement in this case comprises an axially movable locking pin that is arranged on the nacelle structure and corresponding locking housings formed in the wind turbine rotor. The locking pin has a tapered end for compensating for misalignments and plays into the holes. Due to the location and the small dimensions of the working plane of the locking pin where shear forces are concentrated, extremely high stresses are present resulting in a highly potential risk of failure of the locking pin when the locking arrangement is in a locking position.

Document WO2008059088 discloses an adjustable, self-aligning rotor locking device for preventing the hub from being rotated relative to the wind turbine nacelle. The rotor locking device includes locking pins fixed to the nacelle and actuation means for driving the locking pin axially in relation to at least one corresponding hole formed in the hub. In this case, the location and the small dimensions of the working plane of the locking pin where shear forces are concentrated is the same as the above document such that extremely high stresses are present with a resulting potential risk of failure of the locking pin.

Many other locking arrangements have been provided having in common the location and the small dimensions of the working plane of the locking pin where shear forces are concentrated. For example, documents WO2010102967, WO2005090780 and WO2008155053 all describe locking arrangements for wind turbine applications where a locking pin is movable in a direction towards a locking housing for locking the parts against rotation.

Due to the fact that the locking pin is subjected to high loads when in the locking position and that said loads are concentrated on a small working plane of the locking pin, loads concentrated therein result in that the locking pin may be likely to deform, crack or break when in the locking position. In addition, it also remains difficult to compensate for radial misalignments in prior art locking arrangements.

SUMMARY

The above disadvantages have been overcome by the present locking arrangement for preventing at least one part from rotating around an axis of rotation relative to at least another part in a wind turbine when the locking arrangement is in a locking position. The locking arrangement comprises a locking member having a longitudinal axis and a working plane where shear forces are concentrated when the locking member is in the locking position and preventing the rotation relative to the at least another part. The working plane is arranged at least substantially parallel to the axis of rotation when the locking member is in the locking position. Furthermore, the present locking arrangement provides additional advantages as it will be explained further below.

As used herein, a working plane of a locking member in a locking arrangement is a plane containing the characteristic dimension of the locking member. A characteristic dimension as used herein refers to a dimension of the locking member that better describes it as a whole. The most preferred implementation of the locking member is an elongated piece which longitudinal dimension, regardless its shape in cross section, is always longer than any other dimension. One example of a preferred locking member is a cylindrical or parallelepiped elongated piece. In this case, the characteristic dimension of the locking pin corresponds to its longitudinal axis, as it is the larger dimension relative to remaining dimensions defining the locking member such as its diameter, height or width.

The present locking arrangement is intended for preventing at least one part from being rotated relative to at least another part around an axis of rotation in a wind turbine, when the arrangement is in a locking position. Said parts of the wind turbine may be, for example, the rotor and the stator of a wind turbine generator. However, the present locking arrangement can be also applied to other rotating parts in a wind turbine, such as the drive train, the main shaft, the main bearing or the hub, the blade pitch mechanism for locking the blades against rotation, the yaw mechanism for locking the nacelle against rotation as well as components arranged in or near the nacelle.

The present locking arrangement is suitable either for onshore or offshore wind turbines. In addition, although the present locking arrangement is suitable for any type of wind turbines, it is especially useful in direct drive wind turbines and large sized wind turbines in general where extremely high loads are involved.

In general, the present locking arrangement is applied to mutually rotating parts around an axis of rotation. Mutually rotating parts as used herein includes at least a first part that is capable of being rotated around an axis of rotation relative to second part which may be either fixed or capable of being rotated relative to the first part around the axis of rotation.

The present locking arrangement comprises one or more locking members. The locking member is an elongated piece may be, for example, a cylindrical or parallelepiped shaped locking pin. In some cases, the locking member may be a parallelepiped elongated pin formed of flat surfaces and at least one inclined surface. This facilitates insertion of the locking pin into one locking housing and reduces misalignments.

The locking member has a longitudinal axis as its characteristic dimension, as stated above. In preferred implementations, the longitudinal axis of the locking pin is parallel to said axis of rotation. However, the longitudinal axis of the locking pin may be at an angle to the axis of rotation.

The locking member has a working plane defined in the locking position where shear forces are concentrated. In the locking position, that is, when the locking member is inserted within one locking housing, the working plane of the locking member contains its characteristic dimension, that is, its longitudinal axis.

The arrangement of the locking member is such that its working plane is arranged at least substantially parallel to the axis of rotation when the locking member is in said locking position. This axis of rotation corresponds to the axis defined by the mutually rotating parts as defined above.

The above means that the reaction forces in the locking member to the shear forces resulting from the rotational tendency of at least one of the mutually rotating parts to rotate in the locking position are in a plane substantially parallel to the axis of rotation of said parts. This greatly enhances the capability of the locking member to withstand shear forces.

In some implementations of the present locking arrangement the working plane contains a longitudinal axis of the locking member. As indicated above, the longitudinal axis of the locking member is its characteristic dimension.

The present locking arrangement may further comprise an actuating device for driving the locking member into and out of the locking position. The actuation of the locking member can be made either axially along an axis parallel to the axis of rotation of the rotating parts or radially relative to the rotating parts. The actuating device may be of the manual and/or the hydraulic type as required. Such actuating device is especially useful in axial actuation locking pins.

The shear strength is directly related to the area of the working plane of the locking member that is subjected to said shear forces. Due to the fact that the working plane is parallel to the axis of rotation defined by the mutually rotating parts a larger area is provided by present solution. The larger area of the working plane in the locking member where the shear forces are concentrated results in that high stresses can be efficiently withstood thus avoiding risks of failure of the locking member when the locking arrangement is in the locking position. As a result, in the present locking arrangement the shear forces applied to the locking member can be better resisted since stress concentrations are advantageously reduced. In addition, material plastifications on the locking member do not occur and the overall behaviour of the locking member is improved.

A wind turbine generator is also provided. This wind turbine generator comprises a stator having a stator flange portion and a rotor having a rotor flange portion. The stator and the rotor flange portions of the wind turbine generator are complimentarily shaped. They both define a locking housing for receiving the previously described locking member. In this wind turbine generator, the locking member may be mounted axially or radially in the generator as stated above.

In preferred implementations of the above wind turbine generator, especially in direct drive wind turbines, one or a plurality (usually one, or even two) locking pins may be formed in the stator of the generator. A number of locking housings may be formed in the above mentioned complimentary flange portions formed in the rotor and the stator of the generator respectively.

When service activities are required, e.g. maintenance or repair operations, replacement of parts, etc., a brake assembly is actuated in order to stop the wind turbine rotor. The locking pin can be then fitted either axially or radially into the target locking housing formed in the complimentary flange portions of in the rotor and the stator of the generator. Once the locking pin is inserted in the locking housing, the wind turbine rotor is locked against rotation and the above service activities can take place safely in compliance with the current applicable guidelines relating to wind energy plants.

Additional objects, advantages and features of examples of the present locking arrangement and wind turbine having such locking arrangement will become apparent to those skilled in the art upon examination of the description or may be learned by their practice as disclosed herein.

BRIEF DESCRIPTION OF THE DRAWINGS

Particular examples will be described in the following by way of non-limiting examples with reference to the appended drawings.

In the drawings:

FIG. 6 is a cross sectional view of a further example of a wind turbine generator with the locking member in a locking position;

FIG. 7 is a cross sectional view of the example of the wind turbine generator in FIG. 6 with the locking member in an unlocking position;

FIG. 8 is an enlarged detail of the cross sectional part view of the wind turbine generator taken along line B-B in FIG. 7; and FIG. 9 is an enlarged detail of the cross sectional part view of the wind turbine generator taken along line C-C in FIG. 6.

DETAILED DESCRIPTION OF EXAMPLES

Figure 1:
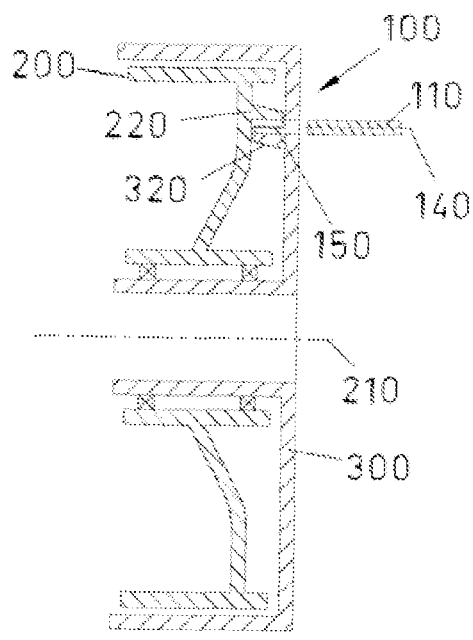
FIG. 1 is a cross sectional view of one example of a wind turbine generator in which the present locking arrangement is provided and where a locking member is shown in an unlocking position.
Figure 2:
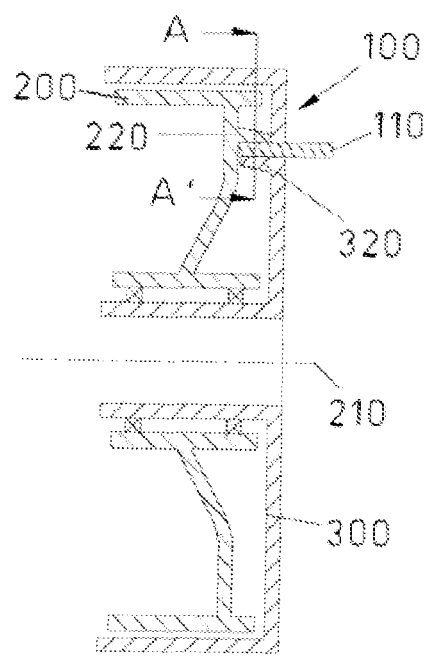
FIG. 2 is a cross sectional view of a wind turbine generator of the example of the present locking arrangement in FIG. 1 with the locking member shown inserted into a locking housing, i.e. in a locking position.
Figure 3:
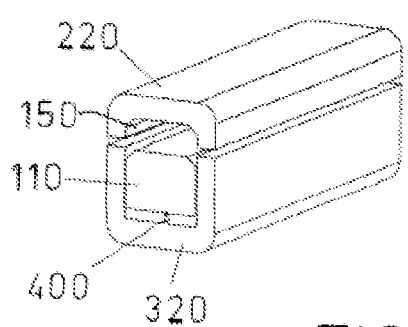
FIG. 3 is a perspective view of one example of a locking pin of the locking arrangement fitted between rotor and stator flange portions.
Figure 4:
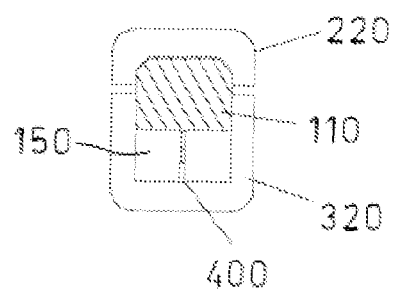
FIG. 4 is an elevational view of the example of a locking pin shown in FIG. 3.

The FIGS. 1-9 show a wind turbine generator, or parts thereof, as an example of a possible application of the present locking arrangement. The locking arrangement shown can be also applied to other rotating parts in a wind turbine, such as the drive train, the main shaft, the main bearing or the hub, the blade pitch mechanism (for locking the blades against rotation around their longitudinal axis), the yaw mechanism (for locking the nacelle against rotation around the longitudinal axis of the tower), components arranged in or near the nacelle, etc.

The locking arrangement shown in the FIGS. 1-9 is indicated as a whole by reference numeral 100. The locking arrangement 100 shown in the figures is intended for preventing a generator rotor 200 from rotating relative to a generator stator 300 of the wind turbine when the locking arrangement 100 is in a locking position for maintenance and other operations as shown in FIGS. 2, 4, 6 and 9 of the drawings.

Rotation refers herein to the angular movement of the generator rotor 200 relative to the generator stator 300 around the axis of rotation 210 of the rotor 200.

The locking arrangement 100 shown in the examples of the figures comprises a locking member. The locking member is a parallelepiped elongated locking pin 110 as the one shown for example in FIGS. 3-5 of the drawings. The locking pin 110 is formed of flat surfaces 120 and two inclined surfaces 130 as it can be seen in FIG. 5.

The stator 300 of the wind turbine generator comprises a flange portion 320. Similarly, the rotor 200 of the wind turbine generator has a flange portion 220. This can be seen in FIGS. 1-4 and 6-7. The rotor and stator flange portions 220, 320 are complimentarily shaped such that both define corresponding locking housings 150. The locking housings 150 are sized and shaped to receive the locking pin 110 in the locking position, as shown in the figures.

The locking position of the locking arrangement 100 is defined when the locking pin 110 is inserted within one locking housing 150. The locking pin 110 can be fitted in a locking housing 150 either axially or radially relative to the generator rotor 200.

Figure 5:
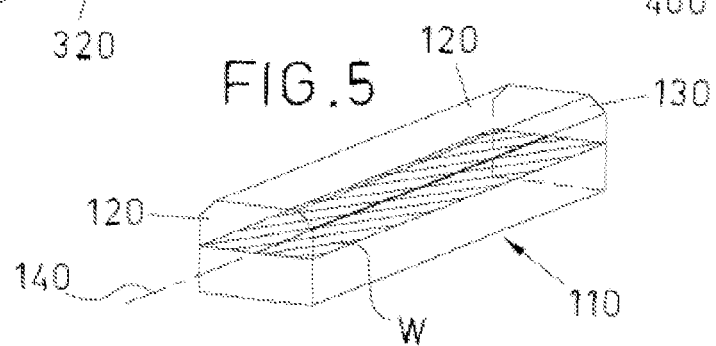
FIG. 5 is a perspective view of the example of the locking pin shown in FIG. 3, in which the corresponding working plane has been depicted.

As depicted in FIG. 5, a working plane W is defined in the locking pin 110. This working plane W is defined when the locking pin 110 is in the locking position, that is, when it is fitted into a locking housing 150. The working plane W contains a characteristic dimension of the locking pin 110, that is, its longitudinal axis 140. The longitudinal axis 140 of the locking pin 110 is the dimension that better describes the locking pin 110 as a whole. Where the locking pin 110 is cylindrical in shape, its characteristic dimension would be its longitudinal axis 140 as well.

The arrangement of the locking pin 110 relative to the generator rotor and stator 200, 300 is such that the working plane W is arranged parallel to the axis of rotation 210 of the rotor 200 when the locking pin 110 is in the locking position. This can be seen in FIGS. 1-2 and 6-7 in which the axis of rotation 210 of the rotor 200 is parallel to the longitudinal axis 140 of the locking pin 110 in conjunction with FIG. 5 in which the working plane W of the locking pin 110 contains the longitudinal axis 140 of the locking pin 110.

Due to the fact that the working plane W is parallel to the axis of rotation 210 of the rotor 200, the shear forces applied to the locking pin 110 are better resisted when the locking pin 110 is in the locking position. This is because a larger area, i.e. the whole plane W, is presented so the shear forces can be better withstood and stress concentrations are thus reduced and material plastification on the locking pin 110 is prevented from occurring.

The locking arrangement 100 further comprises an actuating device 400 for driving the locking pin 110 into and out of the locking position. The actuating device 400, which in the example shown in FIGS. 3-4 and 9 comprises a hydraulic cylinder, is designed to move the locking pin 110 into and out of the locking housing 150. The actuation of the locking pin 110 through the actuating device 400 can be made either axially along the longitudinal axis 140 of the locking pin 110 or radially to the generator rotor 200. In practice, radial actuation of the locking pin 110 is preferred as fewer parts are hindering the rotor locking operation in the generator. The actuating device 400 may be additionally or alternatively of the manual type.

When service activities are to be performed, a rotor brake assembly (not shown) stops the generator rotor 200 of the wind turbine. Then the longitudinal axis 140 of the locking pin 110 is aligned with that of one of the locking housings 150. Then locking pin 110 is then pushed either axially or radially into the target locking housing 150, see FIGS. 8 and 9, such that the generator rotor 200 becomes locked against rotation relative to the generator stator 300.

Although only a number of particular examples and examples of the present locking arrangement have been disclosed herein, it will be understood by those skilled in the art that other alternative examples and/or uses and obvious modifications and equivalents thereof are possible. For example, it has been shown that the locking pin (110) could be mounted axially or radially in the generator. However, there could be the case of having more than one locking pins (110) such that one or more of them are mounted axially in the generator and another or others are mounted radially in the same generator.

Reference signs related to drawings and placed in parentheses in a claim, are solely for attempting to increase the intelligibility of the claim, and shall not be construed as limiting the scope of the claim. Furthermore, the claims cover all possible combinations of the particular examples described, so the scope should not be limited by particular examples, but should be determined only by a fair reading of the claims that follow.

The invention claimed is:
1. A wind turbine generator, comprising:
a rotor having a rotor flange portion and a stator having a stator flange portion,
a locking member for preventing the rotor from rotating about an axis of rotation relative to the stator, and
the rotor and stator flange portions being complimentarily shaped such that both define a locking housing for receiving the locking member when the locking member is in a locking position, the locking member having a longitudinal axis along a length thereof and a working plane extending parallel to the axis of rotation when the locking member is in the locking position, the working plane containing the longitudinal axis, the longitudinal axis defining a maximum dimension of the locking member that is longer than any other dimension of the locking member, the rotor flange portion engaging the locking member only on a first side of the working plane and the stator flange portion engaging the locking member only on a second side of the working plane.

2. The wind turbine generator as claimed in claim 1, wherein the locking member is mounted axially in the generator.

3. The wind turbine generator as claimed in claim 1, wherein the locking member is moveable into and out of the locking position in a direction perpendicular to the longitudinal axis.

* * * * *